(12) United States Patent
Liubinskas et al.

(10) Patent No.: US 10,631,182 B2
(45) Date of Patent: Apr. 21, 2020

(54) MONITORING DECIPHERED S1 PACKETS ON UNIFIED SERVING NODES

(71) Applicant: NetScout Systems, Inc, Westford, MA (US)

(72) Inventors: Tauras Liubinskas, Wilmore, KY (US); Abhishek Saraswati, Santa Clara, CA (US); Subappriya Muthuchamy, Fremont, CA (US); Apurva Prakash, Bangalore (IN); Sandeep Prasad, San Jose, CA (US)

(73) Assignee: Netscout Systems, Inc., Westford, MA (US)

( * ) Notice: Subject to any disclaimer, the term of this patent is extended or adjusted under 35 U.S.C. 154(b) by 243 days.

(21) Appl. No.: 15/489,332

(22) Filed: Apr. 17, 2017

(65) Prior Publication Data
US 2018/0302809 A1     Oct. 18, 2018

(51) Int. Cl.
*H04L 29/06*     (2006.01)
*H04W 24/08*     (2009.01)
(Continued)

(52) U.S. Cl.
CPC .......... *H04W 24/08* (2013.01); *H04L 63/306* (2013.01); *H04W 12/02* (2013.01); *H04W 12/04* (2013.01);
(Continued)

(58) Field of Classification Search
None
See application file for complete search history.

(56) References Cited

U.S. PATENT DOCUMENTS

| | | | |
|---|---|---|---|
| 2004/0057392 A1* | 3/2004 | Bovo | H04L 47/10 370/294 |
| 2010/0034089 A1* | 2/2010 | Kovvali | H04L 67/2842 370/235 |

(Continued)

FOREIGN PATENT DOCUMENTS

| | | | | |
|---|---|---|---|---|
| EP | 2 469 752 A1 | 6/2012 | | |
| EP | 2469752 A1 * | 6/2012 | ........... | H04L 43/028 |

(Continued)

OTHER PUBLICATIONS

Extended European Search Report for European Patent Application No. EP18166889.8, dated Aug. 21, 2018.

*Primary Examiner* — Joseph P Hirl
*Assistant Examiner* — Hassan Saadoun
(74) *Attorney, Agent, or Firm* — Locke Lord LLP; Scott D. Wofsy; Christopher J. Capelli (57) ABSTRACT

First and second pluralities of packets transmitted between UE and the USN over a first interface and a second interface are continuously captured. The first, second and third pluralities contains temporary and permanent identifying information and ciphering key information. A fourth plurality of packets transmitted between the USN and a HSS over a fourth interface is captured. The temporary, permanent identifying information and the ciphering key information are correlated to determine mappings stored in a data repository. A fifth plurality transmitted over a fifth interface is continuously captured. Permanent identifying information corresponding to the temporary identifying information retrieved from the unciphered packets of the fifth plurality is retrieved from the data repository based on the stored mappings. NAS deciphering key information corresponding to the retrieved permanent identifying information is retrieved. The ciphered (Continued)

packets of the fifth plurality of packets are deciphered based on the retrieved NAS deciphering key information.

20 Claims, 4 Drawing Sheets

(51) Int. Cl.
  *H04W 12/06* (2009.01)
  *H04W 12/04* (2009.01)
  *H04W 12/02* (2009.01)
(52) U.S. Cl.
  CPC ......... *H04W 12/06* (2013.01); *H04L 2209/80* (2013.01)

(56) References Cited

U.S. PATENT DOCUMENTS

2012/0159151 A1* 6/2012 Janakiraman ......... H04L 43/028
                                                        713/153
2014/0376390 A1   12/2014 Kreher et al.

FOREIGN PATENT DOCUMENTS

| EP | 2469761 A1 * | 6/2012 | ............. H04L 41/12 |
| EP | 2469763 A1 | 6/2012 | |
| EP | 2958361 A1 * | 12/2015 | ............ H04W 24/02 |

\* cited by examiner

MONITORING DECIPHERED S1 PACKETS ON UNIFIED SERVING NODES

FIELD OF THE INVENTION

This specification is directed, in general, to a wireless communication system, and, more particularly, to monitoring deciphered S1 packets on Unified Serving Nodes (USNs).

BACKGROUND OF THE INVENTION

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation (3G) mobile communication system, which evolved from a second generation (2G) communication system—the Global System for Mobile Communications (GSM). UMTS Terrestrial Radio Access Network (UTRAN) is essentially a radio access network using wideband code division multiple access for user equipment units (UEs). Long Term Evolution (LTE) together with Evolved Packet Core (EPC) is a fourth generation (4G) mobile communication system.

LTE is a packet based IP network that does not support Circuit Switched (CS) calls. Circuit Switched Fallback (CSFB) is a technology that allows voice services to be delivered to LTE devices through the use of GSM or another CS network. When an LTE device needs to make a voice call, the device typically 'falls-back' to a 3G or 2G network.

USNs unify multiple node functions inside one. The USN supports multi-access, GSM, WCDMA, LTE and interworks with Wi-Fi and CDMA. However, certain information critical for monitoring functions flows over a backplane of such node and is not captured by any network monitoring systems, which often creates significant network monitoring challenges.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a first plurality of unciphered packets transmitted between UE and the USN over a first interface, a second plurality of ciphered packets transmitted between the UE and the USN over a second interface a third plurality of unciphered packets transmitted between the USN and a Home Location Register (HLR) over a third interface and a fourth plurality of unciphered packets transmitted between the USN and a Home Subscriber Service (HSS) over a fourth interface are continuously captured. The first plurality of packets contains temporary and permanent user identifying information and ciphering key information associated with the first plurality of packets. The second plurality of packets contains temporary and permanent user identifying information associated with the second plurality of packets. The third plurality of packets contains temporary and permanent user identifying information and ciphering key information associated with the second plurality of packets. The temporary user identifying information, the permanent user identifying information and the ciphering key information are extracted from the captured first, second third and fourth pluralities of packets. The temporary user identifying information and the permanent user identifying information is correlated to determine first mappings between the permanent user identifying information and corresponding temporary user identifying information. The first mappings are stored in a data repository along with associated ciphering key information. A fifth plurality of at least partially ciphered packets and unciphered packets transmitted between the UE and the USN over a fifth interface is continuously captured. The at least partially ciphered packets of the fifth plurality of packets are ciphered using Non Access Stratum (NAS) ciphering key information and the unciphered packets of the fifth plurality contain temporary user identifying information associated with the at least partially ciphered packets of the fifth plurality. The fourth plurality of packets contains NAS deciphering key information associated with the fifth plurality of at least partially ciphered packets. The temporary user identifying information and the NAS ciphering key information is extracted from the captured unciphered packets of the fifth plurality. Permanent user identifying information corresponding to the temporary user identifying information retrieved from the unciphered packets of the fifth plurality is retrieved from the data repository based on the stored first mappings. NAS deciphering key information corresponding to the retrieved permanent user identifying information is retrieved. The at least partially ciphered packets of the fifth plurality of packets are deciphered based on the retrieved NAS deciphering key information.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. In addition, the present invention is not described with reference to any particular programming language. It will be appreciated that a variety of programming languages may be used to implement the embodiments of the present invention as described herein, and any references below to specific languages are provided for disclosure of enablement of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention relate to monitoring performance of a wireless communications network having a USN. In a wireless communications network, a handover is a process for switching from an original radio channel to a new radio channel when a UE moves from a coverage area of one BS to a coverage area of another BS during a period when the UE communicates with a network side. A radio access technology (RAT) handover process (e.g., UMTS-to-LTE system handover) mainly involves network entities, such as an RNC (radio network controller), an SGSN (serving GPRS support node), an MME (mobility management entity), an eNodeB and so on. As noted above, a USN unifies multiple network functions typically dispersed over multiple network nodes inside one node. As an example, USNs can be embodied as a combination of a SGSN and a MME. To monitor performance of a wireless communication network containing both legacy and modern RAT, a plurality of devices dedicated to monitoring data transmitted over the wireless communication network needs to have access to critical information exchanged between the SGSNs and MMEs by internal channels within a USN. However, to monitor ciphered traffic flowing over S1 interface in modern LTE networks, it is essential for a monitoring system to have access to such critical information flows between the SGSNs and MMEs. Hence, according to an embodiment of the present invention, the plurality of devices dedicated to monitoring data transmitted over the wireless communication network need to derive this information by accessing a plurality of links and associated interfaces used by a USN.

Overview of System Architecture

Figure 1:
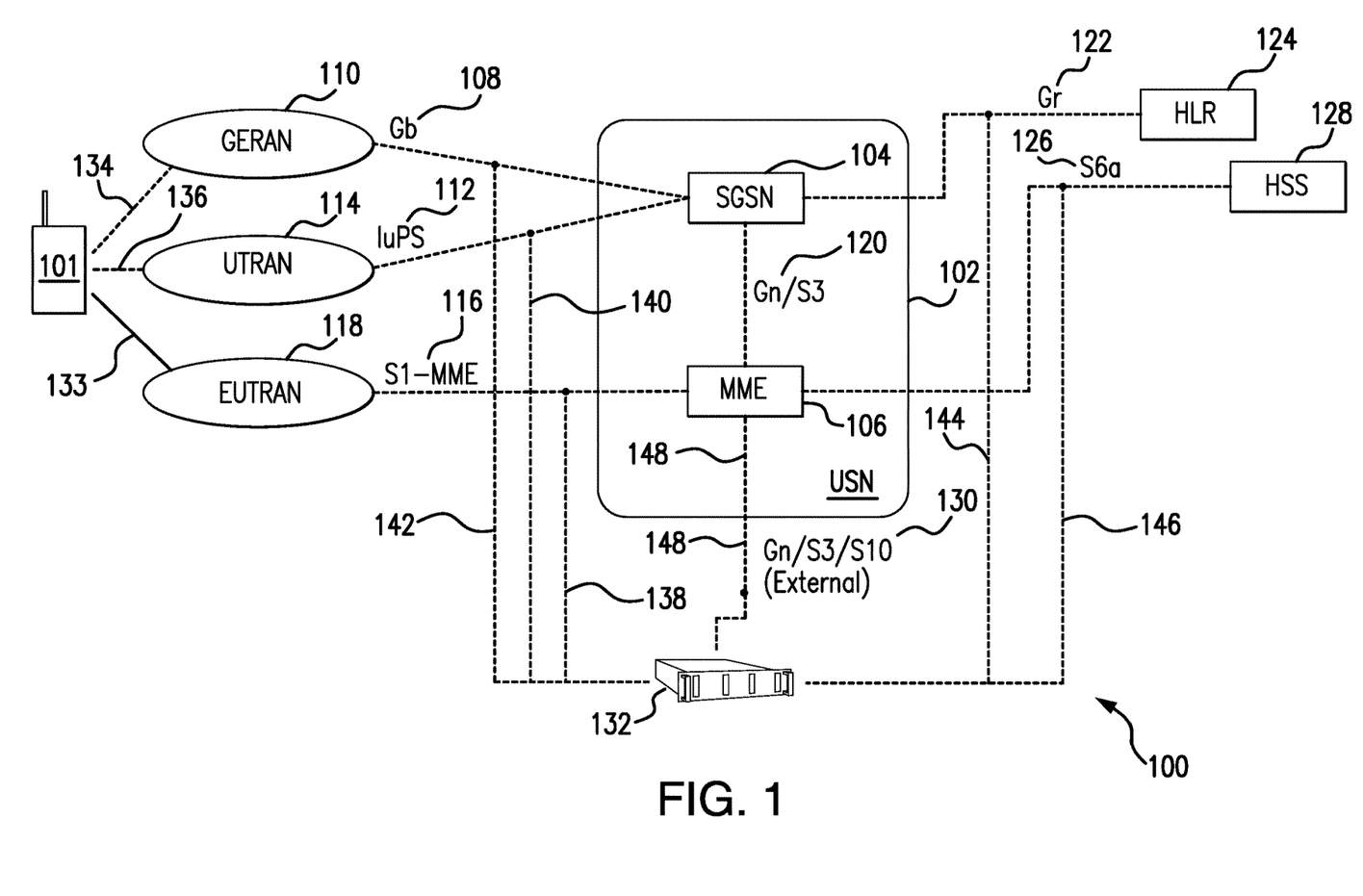
FIG. 1 illustrates the architecture of a system for monitoring a wireless communications network having a USN, according to one embodiment of the present invention.

FIG. 1 the architecture of a system for monitoring a wireless communications network having a USN, according to one embodiment of the present invention. The wireless communications network system 100 may include, among other components, User Equipment (UE) 101, a USN 102 connected to one or more RANs 110, 114, 118 and one or more network monitors 132 (hereinafter collectively referred to as "the network monitor 132"). The network monitor 132 is connected to the wireless communication network 100 to monitor network data packets traversing at certain locations or links of the network 100. The locations or the links connected to the network monitor 132 are preferably critical or important locations of the network 100.

The USN 102 includes a SGSN 104 and a MME 106. The SGSN 104 applies to the second generation (GSM) networks and the third generation (UMTS) networks and the MME applies to the fourth generation (LTE) networks. In various embodiments, multiple SGSN nodes 104, multiple MME nodes 106 and/or multiple USN nodes 102 can be pooled to support various RANs 110, 114 and 118.

A UE 101 may use more than one radio access technology (RAT) at a time, or may switch between multiple RATs, in order to receive uninterrupted service. In FIG. 1, this is represented by a solid line 133 between UE 101 and evolved UMTS terrestrial radio access network (EUTRAN) 118, showing an active connection, a first dotted line 134 between UE 101 and GSM evolution (EDGE) radio access network (GERAN) 110 and a second dotted line 136 between UE 101 and UTRAN 114, showing idle or inactive connections. Other combinations may be contemplated, including: connectivity with one or the other network; connectivity with all networks; and connectivity with no networks (i.e. IDLE). UE 101 is connected to EUTRAN 118 via an LTE-Uu interface (also represented in FIG. 1 by a solid line 133). EUTRAN 118 is connected to MME 106 via an S1 interface 116. Together, EUTRAN 118 and MME 106 provide some of the essential services needed for an LTE network. Specifically, MME 106 controls the LTE access network and is responsible for UE 101 tracking and paging procedures. MME 106 is responsible for generation and allocation of temporary identities to UE 101 and is part of the bearer activation/deactivation process. MME 106 is also responsible for authenticating UE 101 by interacting with Home Subscriber Service (HSS) 128. MME 106 is linked to HSS 128 via the S6a interface 126. MME 106 is the termination point for ciphering/integrity protection for NAS signaling and handles security key management.

As mentioned above, UE 101 is also potentially connected to GERAN 110 and UTRAN 114, which provide GSM, EDGE, and UMTS services. GERAN 110 and UTRAN 114 are connected to core network nodes that provide GSM, EDGE and UMTS services, such as SGSN 104, via a Gb interface 108 and an Iu interface, respectively. The Iu interface is divided between an interface for Circuit Switched communications (Iu-CS) and an interface for packet data via Packet Switched communications (Iu-PS). The SGSN 104 is coupled to the UTRAN's 114 RNCs via the Iu-PS interface 112 for Packet Data Services.

According to an embodiment of the present invention, the USN node 102 serves to coordinate and process the functions of Authentication, Authorization and Accounting (AAA functions). When the UE 101 travels beyond its home network (e.g., home UTRAN network 114) and/or switches between networks 110, 114, 118, the USN 102 facilitates the UE's 101 use of a different network (e.g., foreign network) by being able to coordinate the AAA functions so that the new (foreign) network will permit the UE 101 to conduct communications. To assist in implementing this activity, the wireless communication network 100 includes a Home Location Register (HLR) 124 which tracks the UEs for which it is the home network. A Home Service Server (HSS) 128 is provided in conjunction with the HLR 124 to process the AAA functions.

As shown in FIG. 1, the HSS 128 and HLR 124 are shared by each of the UMTS, GSM, EDGE, and LTE networks to provide services that include AAA functions. The HLR 124 is interfaced with the USN 102 via an interface known as Gr 122 which supports AAA functions through a Mobile Application Part (MAP) Protocol. The HLR 124 is responsible for generating secret ciphering keys. Additionally, the HSS 128 is connected to the MME 106 via an S6a interface 126 over which the MME 106 provides a packet switched location update to the HSS 128. The SGSN 104 and the MME 106 of the USN 102 are connected using interfaces known as Gn and S3 120.

When a change of radio access technology occurs, such as from GERAN 110/UTRAN 114 to EUTRAN 118 or from EUTRAN 118 to GERAN 110/UTRAN 114, a subscriber commonly initiates Tracking Area Update (TAU) procedures for LTE or Routing Area Update (RAU) procedures for UMTS. A tracking area update (TAU) message causes a tracking area list to be updated at the MME 106 with the location of the UE 101, and also causes the MME 106 to update the HSS 128 with the current tracking area (TA) of the UE 101. A RAU message performs a similar function in UMTS networks. However, the UE 101 is considered to only belong to a single RAT at any given time, and the UE 101 commonly initiates a TAU or RAU each time the UE 101 moves from one radio access technology to another.

According to an embodiment of the present invention, the wireless communications network system 100 may further include one or more network monitors 132. The network monitors 132 are hardware, software, firmware or a combination thereof for monitoring network communication at various locations or links of the wireless network 100. Each of the network monitors 132 may be deployed at certain locations or links of the network 100 to collect network data traversing the locations or links.

As described in greater detail below, when the wireless network system 100 incorporates 2G and 3G technology with the 4G technology, to address UE's 101 ever changing radio access technology, the network monitor 132 needs to access substantially all interfaces connected to the USN 102. In one embodiment, the network monitor 132 is connected to the control plane of the S1 interface (hereinafter referred to as S1-MME interface) 116 via link 138 and to the control plane of the IuPS interface 112 via link 140. When the UE 101 tries to establish a user plane bearer through the control plane, after the bearer is successfully established, the user plane data can be transmitted by the carrier. Furthermore, the network monitor 132 is connected by link 142 to the Gb interface 108. In various embodiments of the present invention, network traffic transmitted over the Gb interface 108 can be categorized as either control traffic or data traffic based on Service Access Point Identifier (SAPI) either at a network switch or internally in the network monitor 132. By way of background, ciphering can be performed to provide authentication and radio link privacy to UE 101 on a GERAN network 110 by scrambling the UE's 101 Gb control traffic.

At least in some embodiments, the network monitor 132 may also be connected to the Gr interface 122 and the S6a interface 126 via links 144 and 146, respectively. The Uu air interface 133 allows UE 101 to communicate with EUTRAN 118 using the Radio Resource Control (RRC) protocol. Above the RRC layer is the Evolved Packet System (EPS) NAS layer protocol, which is carried all the way to the MME 106. As noted above, S1-MME 116 is an interface by which components of EUTRAN 118 (e.g., an eNodeB) communicate with the MME 106 using the S1-AP protocol with the EPS NAS Layer protocol on top of S1-AP. The S1-MME interface 116 uses Stream Control Transmission Protocol (SCTP) transport, and may be directly monitored by the network monitor 132. In addition, the EPS NAS layer, which is ciphered in production wireless networks, may be deciphered by the network monitor 132 if the S1 deciphering keys from the S6a interface 126 are monitored. A UE typically attaches to the network and establishes a cipher key with the network. The network monitor 132 is configured to capture the cipher key or the information used to generate the cipher key during subsequent UE activity to be able to decipher messages associated with the UE 101. At least in some situations a UE may detach and reattach. It should be noted that reattachment message typically includes a temporary identifier. The ciphered Gb control packets may be deciphered by the network monitor 132 if the Gb deciphering keys are monitored on the Gr interface 122.

As noted above, in various embodiments, multiple SGSN nodes 104, multiple MME nodes 106 and/or multiple USN nodes 102 can be pooled to support the GERAN 110, UTRAN 114 and/or EUTRAN 118 networks. In such embodiments, the USN 102 may use the S3 interface (between SGSN and MME) or S10 interface (between MME and other MME) to communicate information within such pooled configuration. In other words, the S10 interface serves as a reference point between MMEs for MME relocation (e.g. handover) and MME to MME information transfer, while the S3 interface serves as a reference point between SGSNs and MMEs relocation (e.g., handover) and SGSN to MME information transfer. According to an embodiment of the present invention, the network monitor 132 is enabled to monitor interpool communication between various SGSNs/MMEs/USNs by connecting to the external Gn/S3/S10 interfaces 130 via link 148, for example.

The network monitor 132 may be a special purpose computing device or a software component (not limited to a single process) dedicated to monitoring data communicated via the network 100. Alternatively, the network monitor 104 may be a general purpose computing device with specialized software components installed thereon. In one embodiment, the network monitor 132 is embodied as nGenius Collectors, nGenius Probes or nGenius InfiniStream, available from NetScout Systems, Inc. of Westford, Mass.

Example Architecture of Network Monitor

Figure 2:
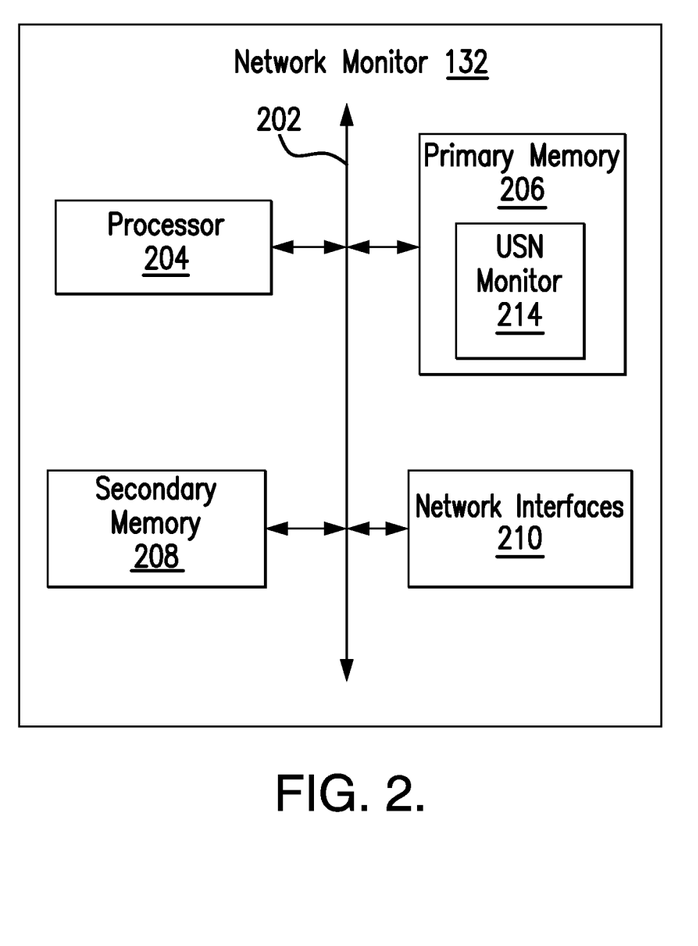
FIG. 2 is a block diagram of the network monitor of FIG. 1, according to one embodiment of the present invention.

FIG. 2 is a block diagram of the network monitor 132, according to one embodiment of the present invention. The network monitor 132 may include, among other components, a processor 204, primary memory 206, secondary memory 208, and one or more network interface(s) 210. These components are connected and communicate via a bus 202. The network monitor 132 may also include other components not illustrated in FIG. 2, such as user input devices (e.g., keyboard and mouse) and display devices (e.g., a display driver card).

The processor 204 executes computer instructions stored in the primary memory 206 and/or the secondary memory 208. Although only a single processor is illustrated in FIG. 2, two or more processors may be used to increase the computing capacity and the processing speed of the network monitor 132.

The primary memory 206 is a computer readable storage medium that stores, among other data, computer instruction modules for processing, storing and retrieving network traffic data. The primary memory 206 may be implemented in various data storage devices (e.g., Random-Access Memory (RAM)) having a faster access speed compared to the secondary memory 208. The faster access speed of the primary memory 206 allows the network monitor 132 to analyze various handovers and effectively monitor traffic transmitted over S1 interface in real time or near real-time.

The secondary memory 208 may be a secondary storage device for storing, among others, archival information. The secondary memory 208 may be embodied, for example, as a solid-state drive, hard disk or other memory devices capable of storing a large amount of data compared to the primary memory 206.

The network interfaces 210 may include a NIC (network interface card) or other standard network interfaces to receive captured network data packets, and to communicate with other network interface devices coupled to the network 100. For example, the network interfaces 210 may be an Ethernet interface, a WiFi (IEEE 802.11) interface, a Gb interface, an IuPS interface, a S1-MME interface, a Gr interface, an S6a interface, a Gn interface, a S3 interface, a S10 interface or other types of wired or wireless network interfaces. In one implementation, parallel interfaces may be recognized and aggregated into a single physical/logical monitoring interface. It is appreciated that parallel interfaces may be handled as separate monitoring interfaces.

In one embodiment, the network interfaces 210 send the captured network data directly to a USN monitor software module 214. The network interfaces 210 may send the captured network data packets to the USN monitor 214 for processing the packets (e.g., ciphered packets). That is, the USN monitor 214 continuously receives the captured network data from the various network interfaces 210, processes the received data extracts temporary and permanent user identifying information and extracts ciphering key information, correlates various user identifying information and ciphering key information and deciphers packets transmitted over S1 interface.

Figure 3:
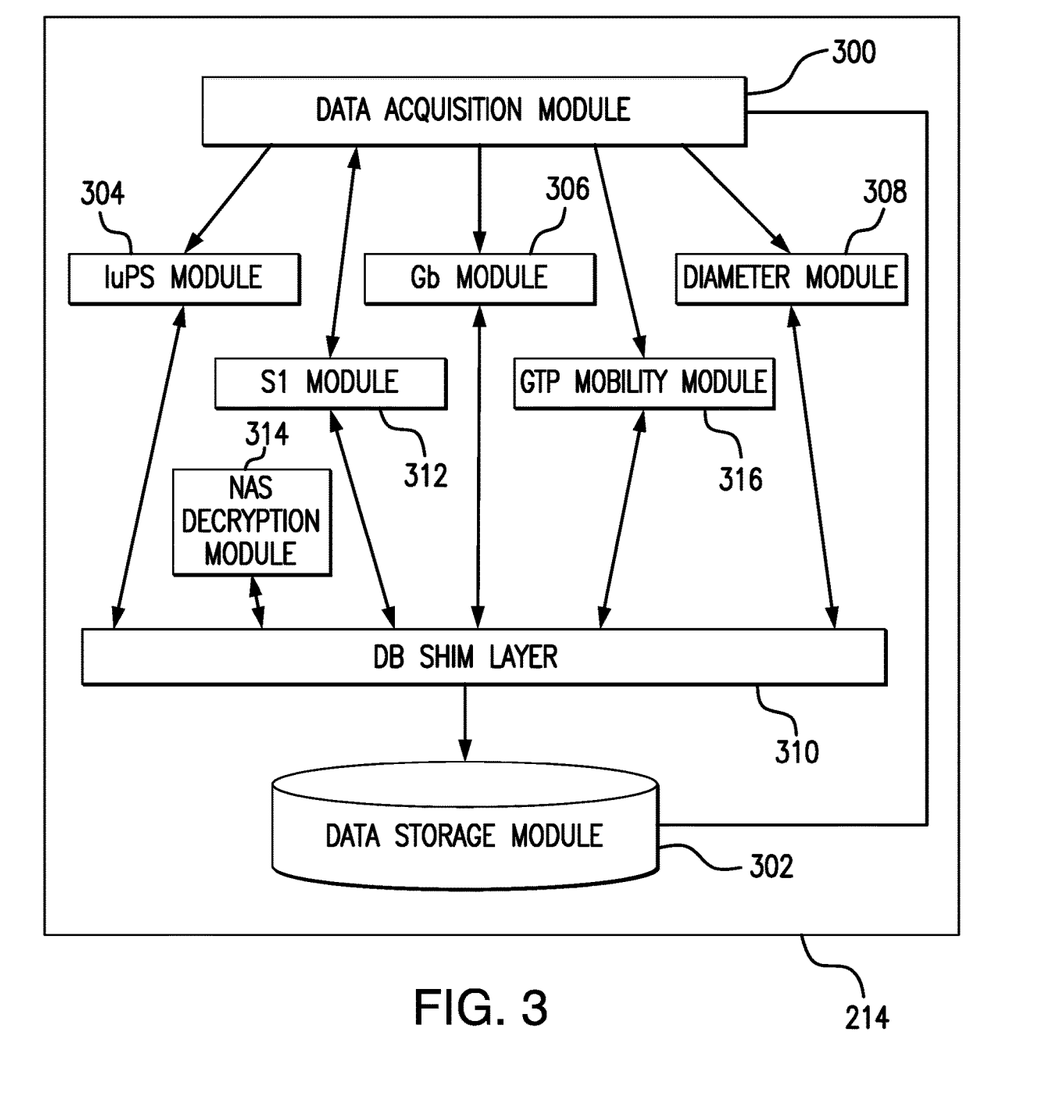
FIG. 3 is a block diagram illustrating the USN monitor module of FIG. 2, according to one embodiment of the present invention.

FIG. 3 is a block diagram illustrating the USN monitor of FIG. 2, according to one embodiment of the present invention. The USN monitor 214 may include one or more software modules. The software modules may comprise a software program or set of instructions executed by a processor. According to the illustrative embodiment of FIG. 3, the software modules may include a data acquisition module 300, a data storage module 302, an IuPS module 304, a Gb module 306, a diameter module 308, a database shim layer 310, an S1 module 312, a NAS Decryption module 314 and a GTP mobility module 316.

According to this embodiment, the data acquisition module 300 may be generally configured and enabled to receive captured control or data packets and extract user data related to user identifier values, NAS deciphering keys and deciphering state information.

As a non-limiting example, in a fourth generation LTE (EUTRAN) telecommunication network 118 the type of identifiers used for identifying the connected UE 101, differ between the core network nodes and the LTE radio base stations, eNodeBs. The identifier values used for identifying the UE 101 are different in the core nodes and the eNodeBs. Core nodes, such as the MME 106, typically use long-term values corresponding to the UE's device 101 hardware or SIM card, such as International Mobile Subscriber Identity (IMSI), Mobile Subscriber ISDN Number (MSISDN) and International Mobile Station Equipment Identity (IMEI), referred to hereinafter as permanent user identifying information. The eNodeBs typically are not aware of these identifiers but instead use temporary values corresponding to the temporary connections the eNodeBs have towards the UE 101 and the core nodes. The temporary identifier that could be assigned by the MME 106 or SGSN 104 include a P-TMSI (Packet Temporary Mobile Subscriber Identity), for Gb interface 108 and IuPS interface 112, or M-TMSI (MME Temporary Mobile Subscriber Identity) for the S1-MME interface 116. In legacy systems (such as UTRAN 114 and GERAN 110), the UE 101 is identified by a RAI. The RAI is a concatenation of several other identifiers. The other identifiers may include a mobile country code (MCC), mobile network code (MNC), location area code (LAC), and routing area code (RAC). It is noted that the combination of the MCC and MNC are also referred to as the public land mobile network (PLMN) identity. The RAI can be expressed as follows:

<RAI>=<MCC><MNC><LAC><RAC>

Since the LTE eNodeBs are not aware of the permanent user identifying information used in the core nodes these identifiers may not be used to identify the UE 101 within the EUTRAN 118. Moreover, a temporary UE identifier used in the EUTRAN 118 is temporary and will change from time to time and between network handovers. Hence, it is not possible to accurately track a particular UE between handovers without tracking mappings between various temporary user identifiers and corresponding permanent user identifiers.

In addition, as part of an authentication and key agreement (AKA) procedure for providing credentials on a network, the UE 101 typically sends the MME 106 a NAS attach request message 410 which may include a permanent user identifier. The MME 106 is configured to retrieve authentication data from the HSS 128 to perform user authentication. The MME 106 may send the HSS 128 an authentication information request message which may include the IMSI (e.g., included in the NAS attach request message) and a network identity information (SNid). The SNid may include a mobile country code and a mobile network code. The authentication information request message 412 may also include data fields indicating a network type (e.g., EUTRAN 118) and a number of requested Authentication Vectors (AV) (not shown in FIG. 1). The HSS 128 is configured to receive the authentication information request message and generate one or more AVs. In an example, the HSS 128 may request the AVs from an Authentication Center (AuC) (not shown in FIG. 1). The AVs include an authentication token (AUTN), an expected response (XRES), a random number (RAND), and a Key Access Security Management Entity ($K_{ASME}$). The $K_{ASME}$ forms the basis for generating AS and NAS ciphering and integrity keys for NAS signaling protection and user plane protection. The AVs are provided to the MME 106 in an authentication information response message. In other 3GPP networks that use AKA (e.g., UTRAN 114, GERAN 110), the AVs may include an authentication token (AUTN), an expected response (XRES), a random number (RAND), a Cipher Key (CK) and Integrity Key (IK). The CK and IK are used for ciphering and integrity protection of the messages.

According to an embodiment of the present invention, the NAS decryption module 314 (described in greater detail below) may define a NAS security state variable that denotes whether currently NAS security is active or not. It is possible to have two such variables to distinguish between ciphering and integrity protection. Note that instead of the NAS security state variable, primitives may be exchanged between the NAS decryption module 314 and the EUTRAN 118 components to indicate presence or absence of ciphering. Also, the security state (deciphering state information) could also be considered a separate PDU that is used to indicate that ciphering has begun, (e.g., a separate NAS message may be used for this purpose). Alternatively, this deciphering state information may be included in every NAS PDU.

The received information is then selectively sent by the data acquisition module to the data storage module 302, the IuPS module 304, the Gb module 306, the diameter module 308 or the S1 module 312. The data storage module 302 resides in the primary memory 206 and may be implemented mainly by a data repository operatively connected to the USN monitor 214. The data storage module 302 may store information related to temporary and permanent user identities, NAS deciphering keys and the security/deciphering state information.

The IuPS module 304 may be generally configured and enabled to process captured control plane (CP) packets transmitted over the IuPS interface 112 when the UE 101 operates in a 3G network, such as UTRAN 114. In one embodiment, the IuPS module 304 processes captured subscriber and session information during session establishment such as packet data protocol (PDP) context activation. The IuPS module 304 can be implemented to provide full mobility for offloaded traffic. The captured subscriber and session information may be used by the USN monitor 214 to generate the mapping between the permanent and temporary user identifying information. In some cases the captured subscriber and session information may include ciphering keys that will be processed by the IuPS module 304.

The Gb module 306 may be generally configured and enabled to process captured packets transmitted over the Gb interface 108 when the UE 101 operates in a 2G network, such as GERAN 110. In one embodiment, the Gb module 306 processes captured subscriber and session information during session establishment and generates the binding between the permanent user identifiers (IDs) and the temporary user IDs across the Gb interface 108. The Gb module 306 may also include code that performs Gb message deciphering which may use captured packets transmitted over the Gr interface 122 to acquire the ciphering keys. The ciphering parameters are: CK (the secret ciphering key), input (a unique frame number) and direction (0 or 1 depending on the transfer direction). For deciphering frames captured on the Gb interface 108 this translates to the requirement of knowing the three parameters CK, input and direction for each frame transmitted over the Gb interface.

The diameter module 308 may be generally configured and enabled to process authentication requests and responses transmitted over the S6a interface 126. The authentication request is typically a diameter protocol message with AVs as informational elements, as described above. The diameter module 308 may also be generally configured and enabled to retrieve NAS deciphering keys from the authentication request/response messages.

Next, at least one of IuPS module 304, Gb module 306, diameter module 308 passes retrieved and extracted information to the database shim layer 310. In an embodiment, the database shim layer 310 resides in the data storage module 302 and communicates with the data acquisition module 300, IuPS module 304, Gb module 306, diameter module 308 and the S1 module 312. In an embodiment, the USN monitor 214 may use the shim layer 310 to combine information received from multiple modules 300, 304, 306, 308 and 312. The shim layer generates additional code to enable the update of the permanent identifier information, temporary identifier information, NAS deciphering key information and deciphering state information stored by the data storage module 302.

The S1 module 312 may be generally configured and enabled to process captured packets transmitted over the S1-MME interface 116 when the UE 101 operates in a 4G network, such as EUTRAN 118. The S1 module 312 may support tracking of the user identifier information contained within packets transmitted over the S1-MME interface 116. The S1 module 312 may also be configured and enabled to pass the updated permanent user identifying information and temporary user identifying information as well as the deciphered NAS packets to the data storage module 302 through the shim layer 310. The NAS decryption module 314 may be generally configured and enabled to decrypt NAS packets exchanged over the S1-MME interface 116 by the MME 106 and the UE 101. In one embodiment, the MME 106 transmits a NAS authentication request to the UE 101, which responds with a NAS authentication response message. The MME 106 may transmit a NAS Security Mode Command (NAS SMC) message to the UE 101. The UE 101 then transmits an "NAS Security Mode Complete" message to the MME 106.

The GTP Mobility module 316 may be generally configured and enabled to process captured packets transmitted over the Gn/S3/S10 interfaces 130 in certain embodiments where the USN 102 is pooled together with multiple SGSN nodes, multiple MME nodes and/or multiple USN nodes. The GTP mobility module 316 may also be configured and enabled to provide mappings between the permanent user identifying information and corresponding temporary user identifying information and mappings between the permanent user identifying information and corresponding ciphering key information when mobile users move between multiple SGSNs/MMEs/USNs.

Figure 4:
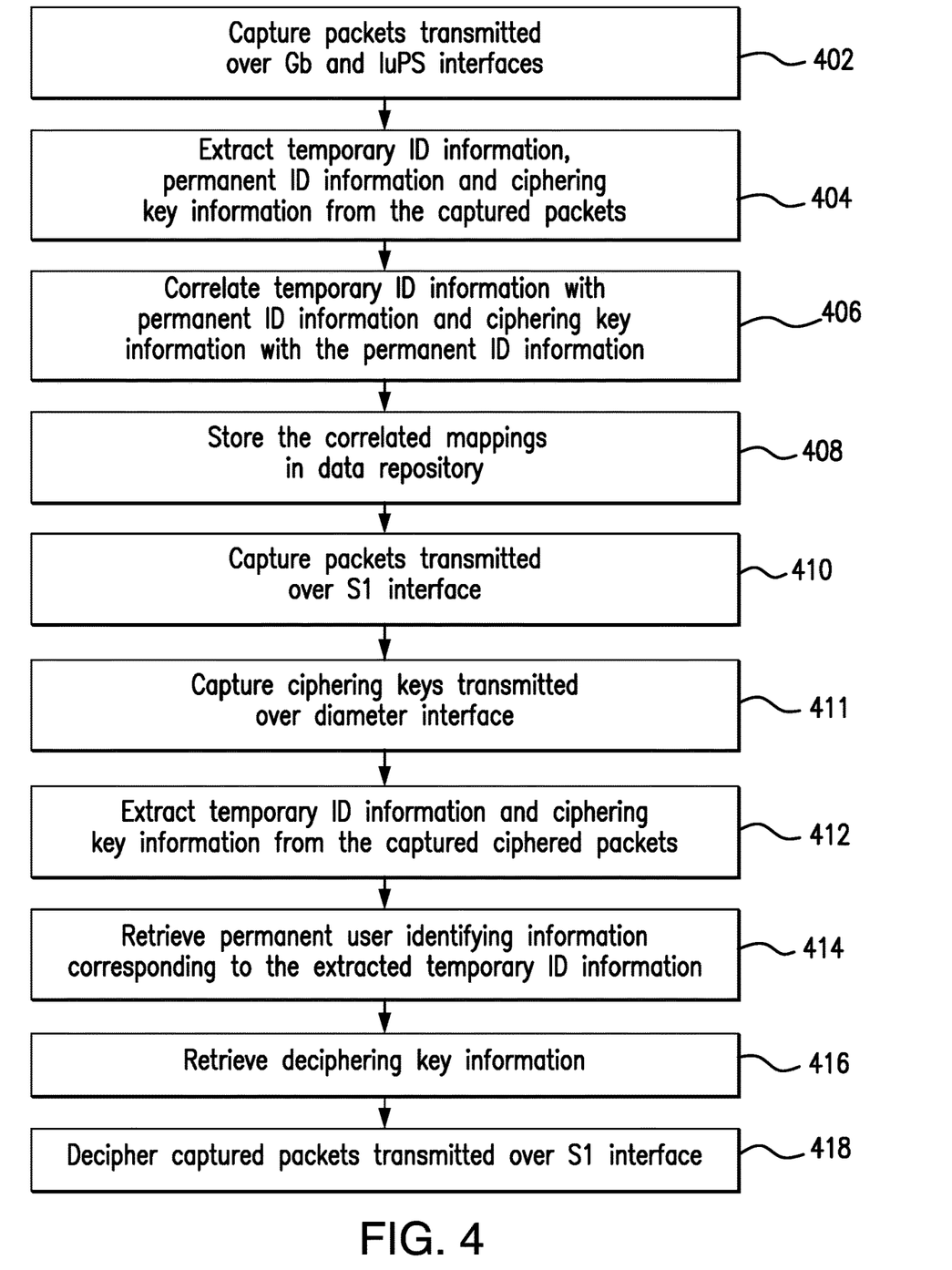
FIG. 4 is a flowchart illustrating a method for monitoring deciphered packets on a USN in a wireless communication network, in accordance with illustrative embodiments of the present invention.

FIG. 4 is a flowchart illustrating a method for monitoring deciphered packets on a USN in a wireless communication network, in accordance with illustrative embodiments of the present invention. Before turning to description of FIG. 4, it is noted that the flow diagrams shown therein is described, by way of example, with reference to components shown in FIGS. 1, 2 and 3, and although these operational steps may be carried out in any system and are not limited to the scenario shown in the aforementioned figure. Additionally, the flow diagram in FIG. 4 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more additional steps may be included.

USN monitor 214 typically monitors traffic on the S1-MME interface 116 to correlate with related traffic to create session records. However, NAS component of the traffic on S1-MME 214 is often ciphered. Without the appropriate cipher keys to decrypt the messages, the traffic cannot be used by the USN monitor 214. Thus, in order to monitor ciphered packets on the USN 102, the USN monitor 214 needs to decipher packets transmitted over the S1-MME interface 116. According to embodiments of the present invention, advantageously, the USN monitor 214 is configured to identify cipher key information by monitoring data transmitted over other interfaces, especially during inter radio access technology handover by the user equipment.

Accordingly, at step 402, the USN monitor 214 continuously captures a first plurality of packets transmitted over the IuPS interface 112 when the UE 101 operates in a 3G network and continuously captures a second plurality of packets transmitted over the Gb interface 108 when the UE 101 operates in a 2G network. Packets may be captured via network interface cards 210 supporting, for example, Gb 108 and IuPS 112 interfaces. In one example, a network flow may include a user making a 4G call on the UE 101 over the EUTRAN network 118. The call may get handed over to 3G-UTRAN network 114 (e.g., the user drops out of 4G coverage cells) and then this call may be handed to 2G-GERAN 110 (e.g., the user drops out of both 4G and 3G coverage cells). Each of these hops may be monitored using the USN monitor 214 which may continuously capture packets. The information captured from the IuPS interface 112 includes temporary and permanent user identifying information and possibly ciphering key information associated with the first plurality of packets, while the information captured from the Gb interface 108 includes temporary and permanent user identifying information associated with the second plurality of packets and ciphering key information associated with the ciphered control packets transmitted over the GB interface 108.

At step 404, the USN monitor 214 extracts temporary and permanent user identifying information and ciphering key information from the captured traffic associated with an authentication procedure. For example, the USN monitor 214 may capture the cipher key or the information used to generate the cipher key, when the UE 101 attaches or during subsequent UE 101 activity. In one embodiment, the USN monitor 214 may use the captured IMSI as the permanent identity of the UE 101. This step may further involve determining deciphering parameters discussed above, such as CK, input and direction, for each packet transmitted over the Gb interface 108.

At step 406, the USN monitor 214 correlates temporary and permanent user identifying information as well as ciphering key information with the permanent user identifying information. For example, the USN monitor 214 may correlate the extracted IMSI with the corresponding extracted temporary user identifying parameters and deciphering parameters such as CK, for example.

According to an embodiment of the present invention, next (step 408) the USN monitor 214 may store the correlated mappings between the temporary and permanent user identifying information and mappings between the permanent user identifying information and ciphering key information for each user in a data repository using, for example, the data storage module 302.

At step 410, the USN monitor 214 captures packets transmitted over the S1-MME interface 116. At least some of the packets transmitted over the S1-MME interface 116 may be unciphered. The unciphered messages may include NAS security mode commands and tracking area update messages. Specifically, when the UE 101 moves back to the EUTRAN network 118, it initiates a Tracking Area Update procedure by sending a Tracking Area Update (TAU) request to the MME 106 via the eNodeB (not shown in FIG. 1). The TAU request includes at least temporary user identifier information associated with the UE 101. In one embodiment, the UE temporary user identifier contains old (previous) P-TMSI, old (previous) RAI (Radio Access Identity) and P-TMSI Signature if latest access (previous access network) was GERAN 110/UTRAN 114. During network access, the serving MME allocates a Globally Unique Temporary Identity (GUTI) to the UE. The GUTI consists of two components: a Globally Unique MME Identity (GUMMEI) and an M-TMSI. The GUMMEI is the identity of the MME that has allocated the GUTI. The M-TMSI is the identity of the UE within that MME. In some cases, the UE 101 may keep multiple temporary identifiers. For instance, GUTI reallocation can happen by TAU request or even otherwise. The new GUTI value will may told to UE 101 on a ciphered request.

At step 411, the USN monitor 214 uses the diameter module 308 to capture NAS ciphering key information transmitted over the diameter interface and stores them in a data repository using, for example, the data storage module 302. At step 412, the USN monitor 214 extracts the temporary user identifier information from the captured TAU request. However, other packets transmitted over the S1-MME interface 116 are ciphered and the USN monitor 214 is unable to decipher these messages based on the temporary ID alone without the deciphering keys.

Advantageously, at step 414 the USN monitor 214 searches the mappings stored in the data repository (at step 408) and retrieves the permanent user identifying information corresponding to the temporary user identifying information (extracted at step 412). Next, at step 416, the USN monitor 214 retrieves NAS deciphering keys from the repository based on the permanent user identifying information. In one embodiment, the diameter module 308 of the USN monitor 214 may use the permanent user identifying information to derive the $K_{ASME}$, which is then used as a base key for the calculation of NAS deciphering keys.

In this fashion, at step 418, the USN monitor 214 uses the derived NAS deciphering key information to decipher at least some of the ciphered packets transmitted over the S1-MME interface 116 that were captured in step 410.

Advantageously, the various embodiments described herein provide more efficient monitoring of network traffic transmitted over the S1 interface in wireless computer networks that incorporate modern (e.g., LTE) communication networks, legacy communication networks and one or more USN nodes serving both types of networks. Certain critical monitoring information flows internally within the USN nodes and is not visible to any monitoring systems. Non-limiting examples of such information include mapping of temporary user identifier information to permanent user identifier information and NAS deciphering keys information. In the aforementioned embodiments, to obtain the deciphering key, one or more of monitoring devices monitor all access interfaces terminating into the USN and utilize mappings that are generated based on the information extracted from packets transmitted over access interfaces when UEs operate in 2G and 3G mode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring deciphered packets on a Unified Serving Node (USN), the method comprising steps of:

continuously capturing a first plurality of unciphered packets transmitted between user equipment (UE) and the USN over a first interface, a second plurality of at least partially ciphered packets transmitted between the UE and USN over a second interface, a third plurality of unciphered packets transmitted between the USN and a Home Location Register (HLR) over a third interface and a fourth plurality of unciphered packets transmitted between the USN and a Home Subscriber Service (HSS) over a fourth interface, the first plurality of packets containing temporary and permanent user identifying information and ciphering key information associated with the first plurality of packets, the second plurality of packets containing temporary and permanent user identifying information associated with the second plurality of packets and the third plurality of packets containing permanent user identifying information and ciphering key information associated with the second plurality of packets;

extracting the temporary user identifying information, the permanent user identifying information and the ciphering key information from the captured first, second, third and fourth pluralities of packets;

correlating the temporary user identifying information and the permanent user identifying information with the ciphering key information to determine first mappings between the permanent user identifying information and corresponding temporary user identifying information;

storing the first mappings and associated ciphering key information in a data repository;

continuously capturing a fifth plurality of at least partially ciphered packets and unciphered packets transmitted between the UE and the USN over a fifth interface, the at least partially ciphered packets of the fifth plurality are ciphered using Non Access Stratum (NAS) ciphering key information and the unciphered packets of the fifth plurality contain temporary user identifying information associated with the fifth plurality of at least partially ciphered packets, wherein the fourth plurality of packets contains NAS deciphering key information associated with the fifth plurality of at least partially ciphered packets;

extracting the temporary user identifying information and the NAS ciphering key information from the captured unciphered packets of the fifth plurality;

retrieving from the data repository permanent user identifying information corresponding to the temporary user identifying information retrieved from unciphered packets of the fifth plurality based on the stored first mappings;

retrieving NAS deciphering key information corresponding to the retrieved permanent user identifying information; and deciphering the at least partially ciphered packets of the fifth plurality of packets based on the retrieved NAS deciphering key information during inter radio access technology (RAT) handover by the UE.

2. The method of claim 1, wherein the USN includes a Serving General Packet Radio Service (GPRS) Support Node (SGSN) and a Mobility Management Entity (MME) and wherein the SGSN and the MME exchange information over USN's internal secure channel.

3. The method of claim 2, wherein the step of correlating further comprises correlating the permanent user identifying information and the ciphering key information to determine second mappings between the permanent user identifying information and corresponding ciphering key information and wherein the step of storing further comprises storing the second mappings in the data repository.

4. The method of claim 3, wherein the exchanged information includes the first mappings and the second mappings.

5. The method of claim 4, wherein the exchanged information is exchanged between the USN and one or more other USNs, one or more MMEs or one or more SGSNs over at least one of S3, Gn and S10 interfaces.

6. The method of claim 1, wherein the first interface comprises an interface with a packet switched network ("IuPS interface") and wherein the first plurality of packets comprise IuPS control plane packets.

7. The method of claim 1, wherein the second interface comprises a Gb interface, the second plurality of packets comprises Gb interface messages and data session information, the third interface comprises a Gr interface, the third plurality of packets comprises unciphered Gr messages, and the fourth interface comprises a S6a interface, the fourth plurality of packets comprises authentication request messages and authentication response messages.

8. The method of claim 1, wherein the fifth interface comprises a S1-MME interface.

9. The method of claim 1, wherein at least one of the first, second and fifth pluralities of packets include one or more handover requests to transfer the UE between the first, second and fifth interfaces.

10. The method of claim 1, wherein one or more of the fifth plurality of packets includes at least a tracking area update (TAU) request message or an attach request message.

11. A network device for monitoring deciphered packets in a wireless computer network, the network device comprising:

a Unified Serving Node (USN) comprising a Serving General Packet Radio Service (GPRS) Support Node (SGSN) and a Mobility Management Entity (MME), the USN configured to exchange information between the SGSN and MME over a backplane channel;

a User Equipment (UE) connected to the USN via one or more radio access networks;

a Home Location Register (HLR) connected to the USN via a third interface and a Home Subscriber Service (HSS) connected to the USN via a fourth interface; and a performance monitoring engine configured to monitor the USN and further configured to:

continuously capture a first plurality of unciphered packets transmitted between the UE and the USN over a first interface, a second plurality of ciphered packets transmitted between the UE and the USN over a second interface, a third plurality of unciphered packets transmitted between the USN and the HLR over the third interface and a fourth plurality of unciphered packets transmitted between the USN and the HSS over the fourth interface, the first plurality of packets containing temporary and permanent user identifying information and ciphering key information associated with the first plurality of packets, the second plurality of packets containing temporary and permanent user identifying information associated with the second plurality of packets and the third plurality of packets containing temporary and permanent user identifying information and ciphering key information associated with the second plurality of packets;

extract the temporary user identifying information, the permanent user identifying information and the ciphering key information from the captured first, second, third and fourth pluralities of packets;

correlate the temporary user identifying information and the permanent user identifying information with the ciphering key information to determine first mappings between the permanent user identifying information and corresponding temporary user identifying information;

store the first and mappings and associated ciphering key information in a data repository;

continuously capture a fifth plurality of at least partially ciphered packets and unciphered packets transmitted between the UE and the USN over a fifth interface, the at least partially ciphered packets of the fifth plurality are ciphered using Non Access Stratum (NAS) ciphering key information and the unciphered packets of the fifth plurality contain temporary user identifying information associated with the fifth plurality of at least partially ciphered packets, wherein the fourth plurality of packets contains NAS deciphering key information associated with the fifth plurality of at least partially ciphered packets;

extract the temporary user identifying information and the NAS ciphering key information from the captured unciphered packets of the fifth plurality;

retrieve from the data repository permanent user identifying information corresponding to the temporary user identifying information retrieved from unciphered packets of the fifth plurality based on the stored first mappings;

retrieve NAS deciphering key information corresponding to the retrieved permanent user identifying information; and decipher the at least partially ciphered packets of the fifth plurality of packets based on the retrieved NAS deciphering key information during inter radio access technology (RAT) handover by the UE.

12. The network device of claim 11, wherein the performance monitoring engine configured to correlate the temporary user identifying information and the permanent user identifying information is further configured to correlate the permanent user identifying information and the ciphering key information to determine second mappings between the permanent user identifying information and corresponding ciphering key information and wherein the performance monitoring engine configured to store the first mappings is further configured to store the second mappings in the data repository.

13. The network device of claim 12, wherein the exchanged information includes the first mappings and the second mappings.

14. The network device of claim 13, wherein the exchanged information is exchanged between the USN and one or more other USNs, one or more MMEs or one or more SGSNs over at least one of S3, Gn and S10 interfaces.

15. The network device of claim 11, wherein the first interface comprises an interface with a packet switched network ("IuPS interface") and wherein the first plurality of packets comprise IuPS control plane packets.

16. The network device of claim 11, wherein the second interface comprises a Gb interface, the second plurality of packets comprises Gb interface messages and data session information, the third interface comprises a Gr interface, the third plurality of packets comprises unciphered Gr messages, and the fourth interface comprises a S6a interface, the fourth plurality of packets comprises authentication request messages and authentication response messages.

17. The network device of claim 11, wherein the fifth interface comprises a S1-MME interface.

18. The network device of claim 11, wherein at least one of the first, second and fifth pluralities of packets include one or more handover requests to transfer the UE between the first, second and fifth interfaces.

19. The network device of claim 11, wherein one or more of the fifth plurality of packets includes at least a tracking area update (TAU) request message or an attach request message.

20. A non-transitory computer readable storage medium structured to store instructions, the instructions when executed, cause a processor in a network device in a wireless computer network to:

continuously capture a first plurality of unciphered packets transmitted between a UE and a Unified Serving Node (USN) over a first interface, a second plurality of ciphered packets transmitted between the UE and the USN over a second interface, a third plurality of unciphered packets transmitted between the USN and a Home Location Register (HLR) over the third interface, and a fourth plurality of unciphered packets transmitted between the USN and a Home Subscriber Service (HSS) over a fourth interface, the first plurality of packets containing temporary and permanent user identifying information and ciphering key information associated with the first plurality of packets, the second plurality of packets containing temporary and permanent user identifying information associated with the second plurality of packets and the third plurality of packets containing temporary and permanent user identifying information and ciphering key information associated with the second plurality of packets;

extract the temporary user identifying information, the permanent user identifying information and the ciphering key information from the captured first, second, third and fourth pluralities of packets;

correlate the temporary user identifying information and the permanent user identifying information with the ciphering key information to determine first mappings between the permanent user identifying information and corresponding temporary user identifying information;

store the first mappings and associated ciphering key information in a data repository;

continuously capture a fifth plurality of at least partially ciphered packets and unciphered packets transmitted between the UE and the USN over a fifth interface, the at least partially ciphered packets of the fifth plurality are ciphered using Non Access Stratum (NAS) ciphering key information and the unciphered packets of the fifth plurality contain temporary user identifying information associated with the fifth plurality of at least partially ciphered packets, wherein the fourth plurality of packets contains NAS deciphering key information associated with the fifth plurality of at least partially ciphered packets;

extract the temporary user identifying information and the NAS ciphering key information from the captured unciphered packets of the fifth plurality;

retrieve from the data repository permanent user identifying information corresponding to the temporary user identifying information retrieved from unciphered packets of the fifth plurality based on the stored first mappings;

retrieve NAS deciphering key information corresponding to the retrieved permanent user identifying information; and decipher the at least partially ciphered packets of the fifth plurality of packets based on the retrieved NAS deciphering key information during inter radio access technology (RAT) handover by the UE.

* * * * *